US012681982B2

(12) United States Patent      (10) Patent No.: US 12,681,982 B2

Miklos et al.      (45) Date of Patent: Jul. 14, 2026

(54) SYSTEMS AND METHODS FOR EFFICIENT MULTIMODAL SEARCH REFINEMENT

(71) Applicant: Google LLC, Mountain View, CA (US)

(72) Inventors: Balint Miklos, Zürich (CH); Rajan Sharad Patel, Los Altos, CA (US); Severin Heiniger, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/871,531

(22) Filed: Jul. 22, 2022

(65) Prior Publication Data

US 2024/0028638 A1     Jan. 25, 2024

(51) Int. Cl.
*G06F 16/532* (2019.01)
*G06F 9/451* (2018.01)
*G06F 16/538* (2019.01)

(52) U.S. Cl.
CPC ............ *G06F 16/532* (2019.01); *G06F 9/453* (2018.02); *G06F 16/538* (2019.01)

(58) Field of Classification Search
CPC .............................. G06F 16/532; G06F 16/538
USPC ......................................................... 707/722
See application file for complete search history.

(56) References Cited

U.S. PATENT DOCUMENTS

| | | | | |
|---|---|---|---|---|
| 11,170,424 | B1 * | 11/2021 | Lee | G06F 16/9532 |
| 2012/0117051 | A1 * | 5/2012 | Liu | G06F 16/90335 |
| | | | | 707/707 |
| 2013/0097181 | A1 * | 4/2013 | Sud | G06F 16/316 |
| | | | | 707/765 |
| 2017/0075958 | A1 * | 3/2017 | Duffy | G06F 16/2455 |
| 2019/0095467 | A1 * | 3/2019 | Kislyuk | G06F 16/5866 |
| 2020/0311126 | A1 * | 10/2020 | Ramesh | G06F 40/169 |
| 2021/0064612 | A1 * | 3/2021 | Huang | G06F 16/3329 |
| 2021/0382922 | A1 * | 12/2021 | Guo | G06N 3/045 |
| 2023/0009267 | A1 * | 1/2023 | Dagan | G06Q 30/0643 |
| 2024/0020538 | A1 * | 1/2024 | Socher | G06F 16/90332 |

OTHER PUBLICATIONS

International Search Report and Written Opinion for Application No. PCT/US2023/028501, mailed Oct. 13, 2023, 12 pages.
International Search Report and Written Opinion for Application No. PCT/US2023/028501, mailed Feb. 6, 2025, 7 pages.

* cited by examiner

*Primary Examiner* — Kimberly L Wilson
(74) *Attorney, Agent, or Firm* — DORITY & MANNING P.A.

(57) ABSTRACT

Systems and methods of the present disclosure are directed to a computer-implemented method for multimodal search refinement. The method includes obtaining a visual search query from a user comprising one or more query images. The method includes providing a search interface for display to the user, the search interface comprising one or more result images responsive to the one or more query images and an interface element indicative of a request to the user to refine the visual search query. The method includes obtaining, from the user, textual data comprising a refinement to the visual search query. The method includes appending, by the computing system, the textual data to the visual search query to obtain a multimodal search query.

18 Claims, 12 Drawing Sheets

SYSTEMS AND METHODS FOR EFFICIENT MULTIMODAL SEARCH REFINEMENT

FIELD

The present disclosure relates generally to user search refinement. More particularly, the present disclosure relates to refinement of visual searches via textual content to form multimodal search queries.

BACKGROUND

Applications, such as virtual assistant applications, have recently began to provide visual search functionality to users. Visual search allows for a user to provide one or more images to an application as a search query. In response, the application can perform a search using the search query and return search results to the user (e.g., via a web search service, etc.). However, the intent of a user when providing image(s) as a search query can be difficult to ascertain. Furthermore, visual search applications that do not accept additional modes of input can only interpret a limited variety of user intents. For example, a visual search application would struggle to identify the intent of a user who provides images of a patterned shirt to a visual search application because they were interested in the pattern, rather than the type of clothing. As such, systems and methods that allow a user to refine their visual search query are greatly desired.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for multimodal search refinement. The method includes obtaining, by a computing system comprising one or more computing devices, a visual search query from a user comprising one or more query images. The method includes providing, by the computing system, a search interface for display to the user, the search interface comprising one or more result images responsive to the one or more query images and an interface element indicative of a request to the user to refine the visual search queries. The method includes obtaining, by the computing system from the user, textual data comprising a refinement to the visual search query. The method includes appending, by the computing system, the textual data to the visual search query to obtain a multimodal search query.

Another example aspect of the present disclosure is directed to computing system for multimodal search refinement. The computing system includes one or more processors. The computing system includes one or more non-transitory computer-readable media that store instructions that, when executed by the one or more processors, cause the computing system to perform operations. The operations include obtaining a visual search query from a user comprising one or more query images. The operations include providing a search interface for display to the user, the search interface comprising one or more result images responsive to the one or more query images and an interface element indicative of a request to the user to refine the visual search query. The operations include obtaining textual data comprising a refinement to the visual search query. The operations include appending the textual data to the visual search query to obtain a multimodal search query.

Another example aspect of the present disclosure is directed to one or more non-transitory computer-readable media that store instructions that, when executed by one or more processors, cause the computing system to perform operations. The operations include obtaining a visual search query from a user comprising one or more query images. The operations include providing a search interface for display to the user, the search interface comprising one or more result images responsive to the one or more query images and an interface element indicative of a request to the user to refine the visual search query. The operations include obtaining textual data comprising a refinement to the visual search query. The operations include appending the textual data to the visual search query to obtain a multimodal search query.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
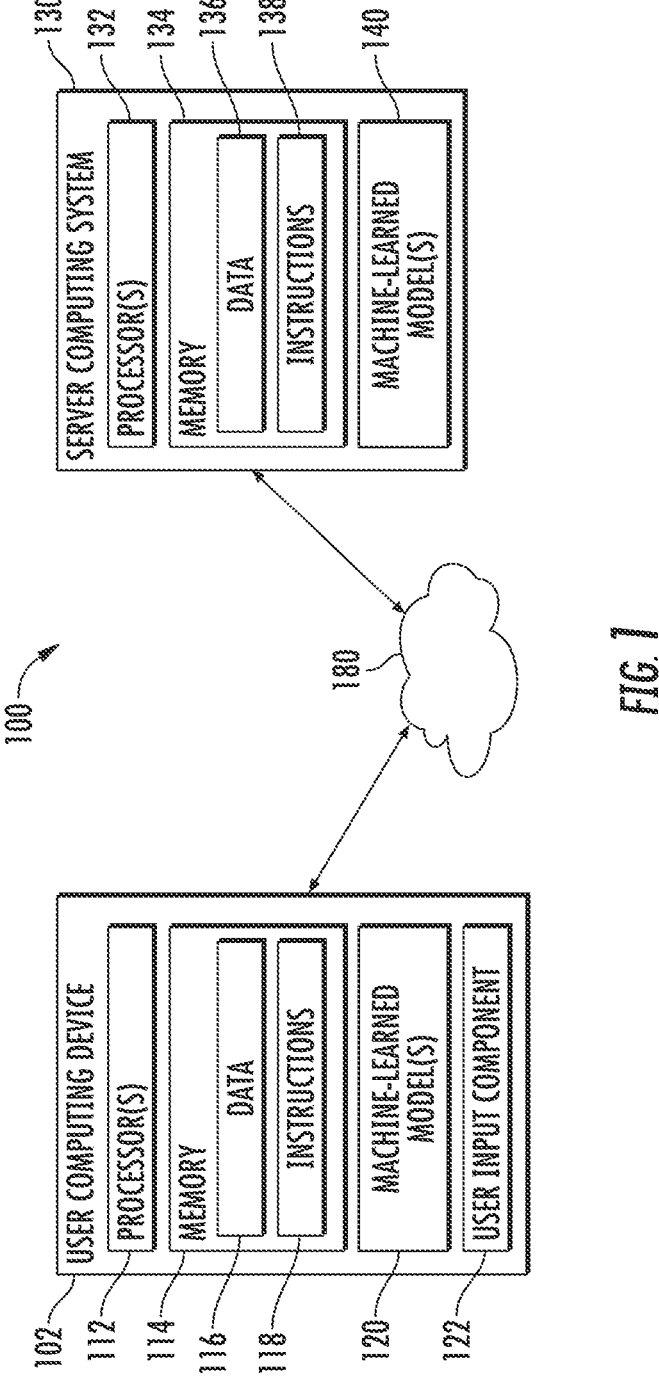
FIG. 1 depicts a block diagram of an example computing system that performs multimodal search refinement according to example embodiments of the present disclosure.

Reference numerals that are repeated across plural figures are intended to identify the same features in various implementations.

DETAILED DESCRIPTION

Overview

Generally, the present disclosure is directed to user search refinement. More particularly, the present disclosure relates to refinement of visual searches via textual content to form multimodal search queries. As an example, a computing system (e.g., a smartphone device, a mobile device, etc.) can obtain a search query from a user that includes one or more query images. A search interface can be provided for display to the user. The search interface can include one or more result images responsive to the one or more query images (e.g., via a reverse image search, etc.) and an interface element indicative of a request to the user to refine the search query (e.g., a textual input field with text prompting the user to refine the search, etc.). The computing system can obtain textual data from the user that includes a refinement to the search query. Once received, the textual data can be appended to the search query to obtain a multimodal search query.

As an example, the user may provide a search query including query image(s) that capture a pair of white sneakers. The one or more result images retrieved in response to the search query may depict other images of white sneakers similar to those captured by the user. The user can provide textual data including the word "red" as a refinement to the search query. The word "red" can be appended to the search query, and one or more search results can be retrieved based on the multimodal search query. A refined search interface can be provided for display to the user that includes the one or more search results (e.g., image(s) of red sneakers of the same model as the white sneakers captured by the user, information descriptive of red sneakers, video associated with red sneakers, etc.). In such fashion, a user can quickly and efficiently provide a refinement to a visual search, therefore substantially improving search accuracy and user experience without having explicit knowledge of other aspects of the visual query (e.g., the user can provide a refinement that specifies a different color for a pair of sneakers without knowing the brand or model of the pair of sneakers to aid in product discovery).

Systems and methods of the present disclosure provide a number of technical effects and benefits. As one technical effect and benefit, users of conventional visual search applications are often required to re-capture images of a query target due to incorrect determination of user intent by the visual search application. In turn, this leads to a frustrating user experience and unnecessary use of resources to re-capture the query target (e.g., power, compute cycles, memory, storage, bandwidth, etc.). However, embodiments of the present disclosure allow for a user to quickly and efficiently refine their visual search with textual data, therefore substantially improving the user experience while eliminating unnecessary resource usage associated with re-capturing query targets.

With reference now to the Figures, example embodiments of the present disclosure will be discussed in further detail.

Example Devices and Systems

FIG. 1 depicts a block diagram of an example computing system 100 that performs visual query refinement according to example embodiments of the present disclosure. The system 100 includes a user computing device 102, and a server computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120 for generation of multi-modal search queries. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel multimodal search query generation across multiple instances of the machine-learned model).

More particularly, in some embodiments, the machine-learned model 120 may process textual content and one or more query images to determine a multimodal search query. For example, the machine-learned model 120 may be trained to modify query image(s), or representation(s) of the query image(s) (e.g., embedding(s), etc.), based on the textual content. In some embodiments, the machine-learned model 120 may be trained to process a representation of the query image(s) and a representation of the textual content to determine the multimodal search query.

Additionally, or alternatively, in some embodiments the machine-learned model(s) 120 may be, or otherwise include, models trained to analyze the one or more query image(s) provided by the user. For example, the machine-learned model 120 may be trained to process the query image(s) to generate an output that classifies objects depicted within the picture. For another example, the machine-learned model 120 may be trained to process the query image(s) to generate a semantic output descriptive of the one or more images (e.g., classifying the objects in the image, determining a user intent for the image, determining a location depicted in the image, determining an object of interest depicted in the image, etc.). In some embodiments, the output of the machine-learned model 120 may be utilized, at least in part, to retrieve the one or more query images for provision to the user.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a multimodal search service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s)

can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 1 illustrates one example computing system that can be used to implement the present disclosure. Other computing systems can be used as well. For example, in some implementations, the models 120 can be both trained and used locally at the user computing device 102.

Example Interface Arrangements

Figure 2A:
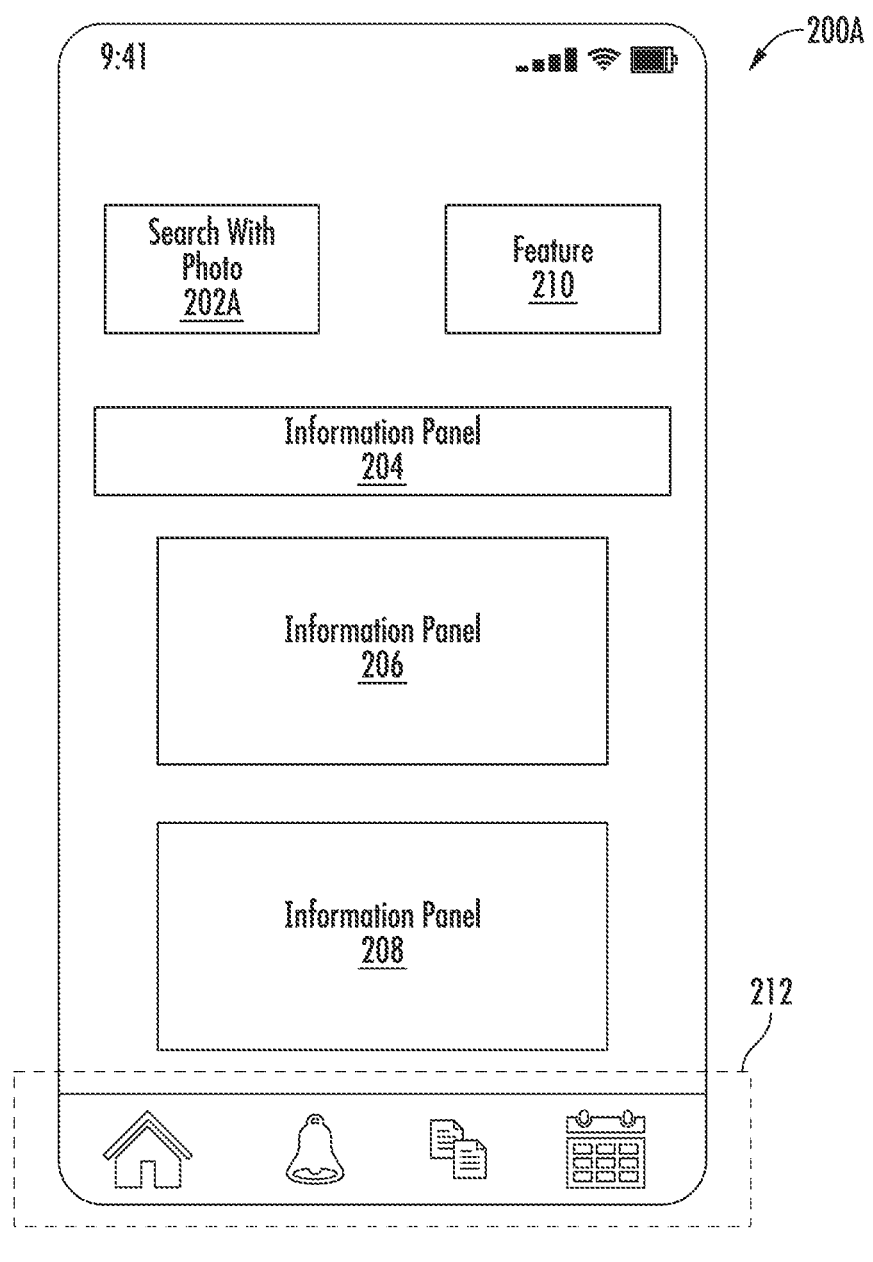
FIG. 2A illustrates an example interface for an application (e.g., a virtual assistant application) with an interface element indicative of a visual search feature of the application according to some embodiments of the present disclosure.

FIG. 2A illustrates an example interface 200A for an application (e.g., a virtual assistant application) with an interface element indicative of a visual search feature of the application according to some embodiments of the present disclosure. Specifically, the interface 200A depicts an interface for an application that provides visual search services, such as a virtual assistant application. As depicted, the interface 200A includes a number of various interface elements that can be selected by the user, such as information panels 204-208 (e.g., information panels for local news, international news, sports, etc.), feature 210 (e.g., an image translation service, etc.), and toolbar 212 (e.g., a bar that links to various features of the interface 200A). It should be noted that these interface elements 204-210 are merely included to illustrate various embodiments of the present disclosure. As such, the layout, purpose, or inclusion of interface elements 204-210 are not necessary for implementation of embodiments of the present disclosure.

The interface 200A of the application may include an interface element 202A that is indicative of a visual search feature of the application. As depicted, in some embodiments the interface element 202A may be a selectable interface element that describes the visual search feature of the application. For example, the depicted interface element 202A indicates a visual search feature with the textual content "search with photo." It should be noted that, although the interface element 202A is depicted at a certain location within the interface 200A, it can be located anywhere within the interface 202A, and can include any textual content that describes the visual search feature of the application. For example, the interface element 202A may instead include the textual content of "Activate Visual Search" or "Search".

Figure 2B:
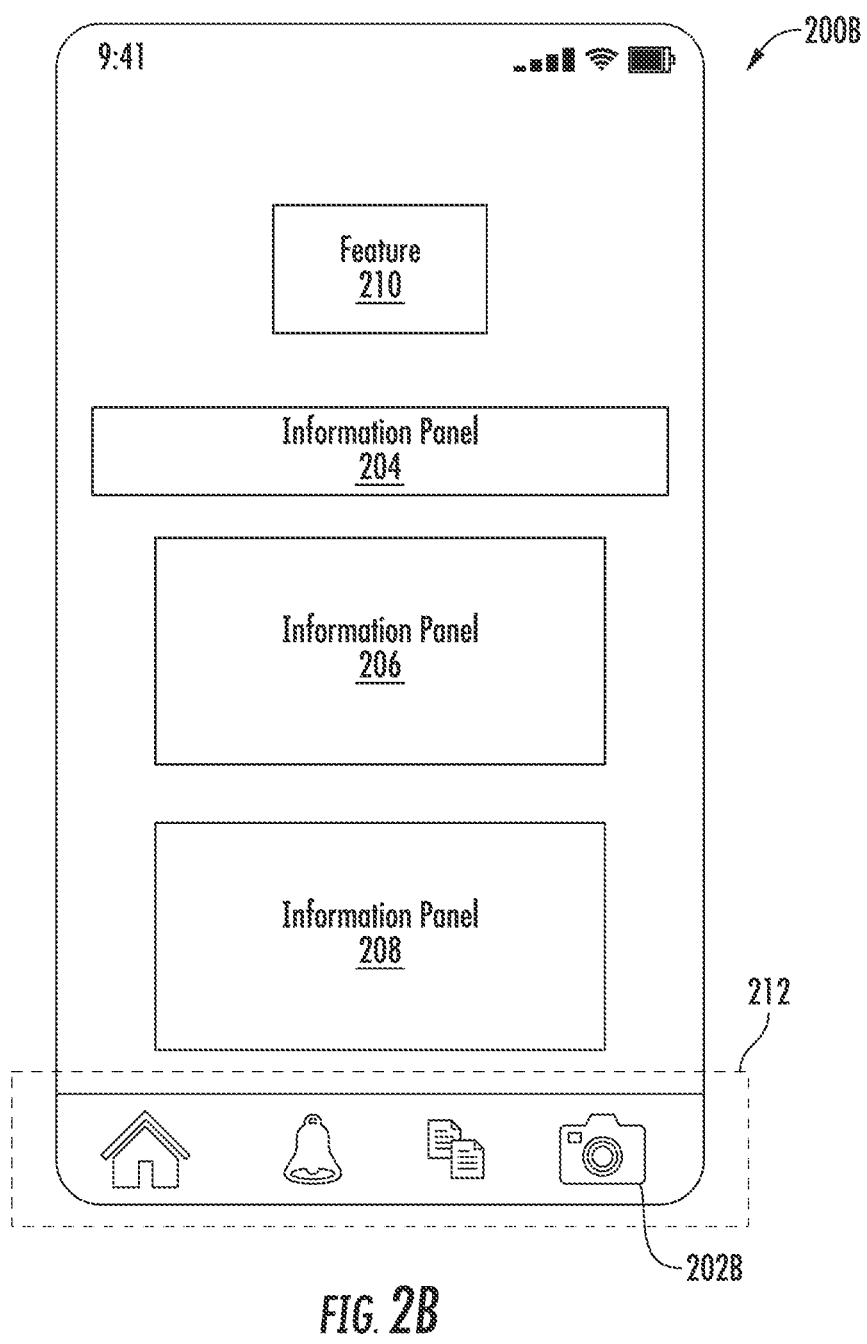
FIG. 2B illustrates an example interface for an application an interface element indicative of a visual search feature of the application according to some other embodiments of the present disclosure.

FIG. 2B illustrates an example interface 200B for an application (e.g., a virtual assistant application) with an interface element 200B indicative of a visual search feature of the application according to some other embodiments of the present disclosure. Specifically, the interface 200B includes an interface element 200B that depicts a camera within the toolbar 212 presented within the interface 200B. It should be noted that, in some embodiments, the toolbar 212 may be a toolbar associated with, or provided by, the operating system of a user device. Alternatively, in some embodiments, the toolbar 212 may be provided by or associated with the application of the interface 200B (e.g., a virtual assistant application).

Similarly, it should be noted that the interface element 202B is not limited to a camera icon. Rather, the interface element 202B included in the toolbar 212 can indicate the visual search feature in any manner (e.g., a magnifying glass icon, a name or icon of a visual search service, etc.).

Figure 2C:
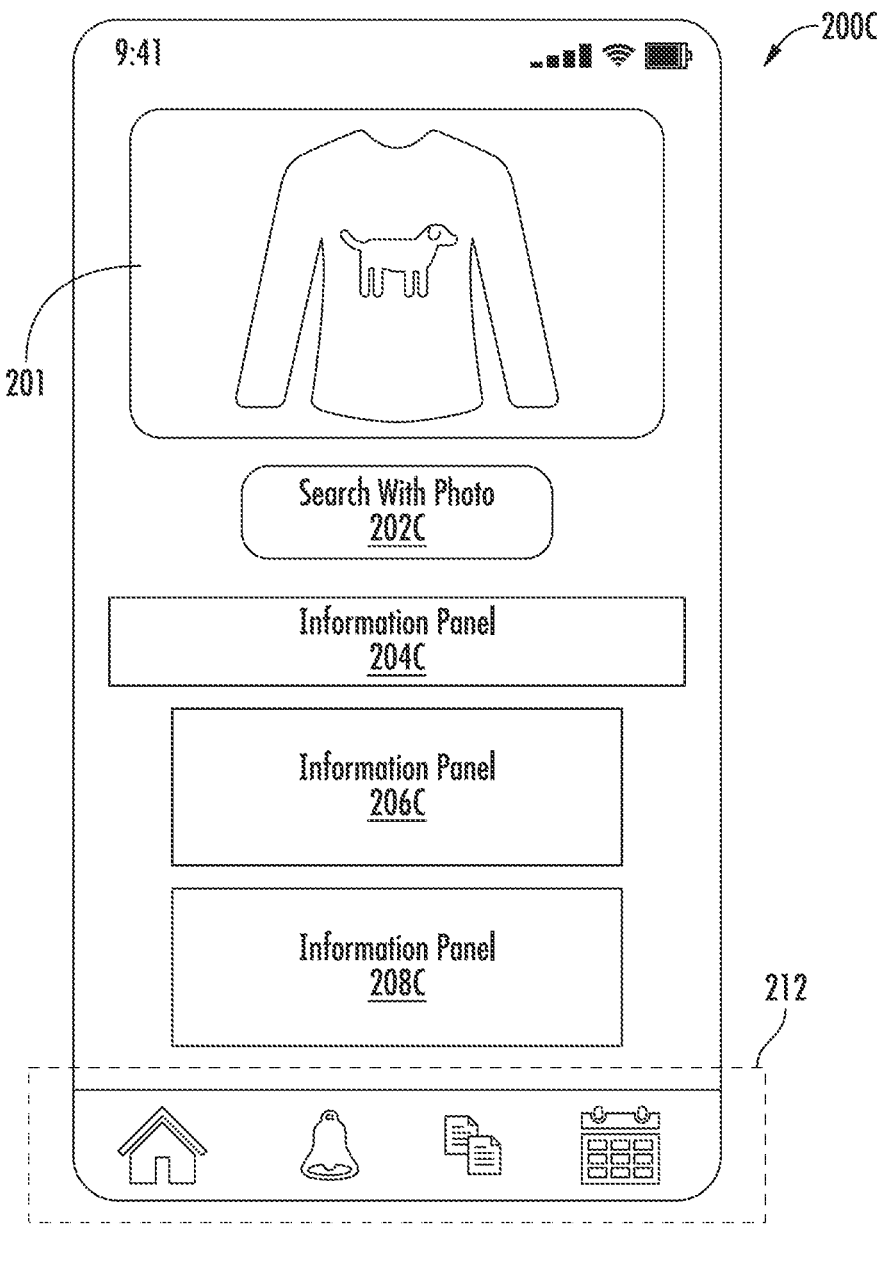
FIG. 2C illustrates an example interface for an application with an interface element indicative of a visual search feature of the application according to some other embodiments of the present disclosure.

FIG. 2C illustrates an example interface 200C for an application (e.g., a virtual assistant application) with an interface element 200C indicative of a visual search feature of the application according to some other embodiments of the present disclosure. Specifically, the interface 200C includes a preview element 201 and an interface element 202C indicative of a visual search feature of the application according to some embodiments of the present disclosure. In some embodiments, the preview element 201 can provide a current view of a camera device of a user device providing the interface 200C. For example, the preview element 201 may provide a real-time preview of the scene currently captured by a camera of a user device (e.g., a smartphone device, a tablet, etc.) providing the interface 200C (e.g., a front-facing camera, a rear-facing camera, a periscope camera, etc.). Alternatively, in some embodiments, the preview element 201 may depict the last image captured using the user device.

As depicted, in some embodiments, the interface element 202C is an interface element separate from the preview element 201 that indicates the visual search feature. Specifically, in some embodiments, interaction with the interface element 202C (e.g., via a touchscreen, etc.) can cause the image currently displayed within the preview element 201 to be captured as a query image. Additionally, in some embodiments, a different interaction (e.g., a touch-and-hold input to a touchscreen) with the interface element 202C may cause images displayed within the preview element 201 to be captured in succession as a plurality of query images (e.g., as video data, etc.).

Alternatively, in some embodiments, the interface element 202C may be integrated with the preview element 201. For example, the interactions described previously may be performed directly to the preview element 201. The preview element 201 may include an indicator that indicates the visual search feature of the virtual assistant application (e.g., a textual overlay or icon overlay indicating interaction with the preview element 201 will capture a query image for the visual search feature, etc.).

Figure 2D:
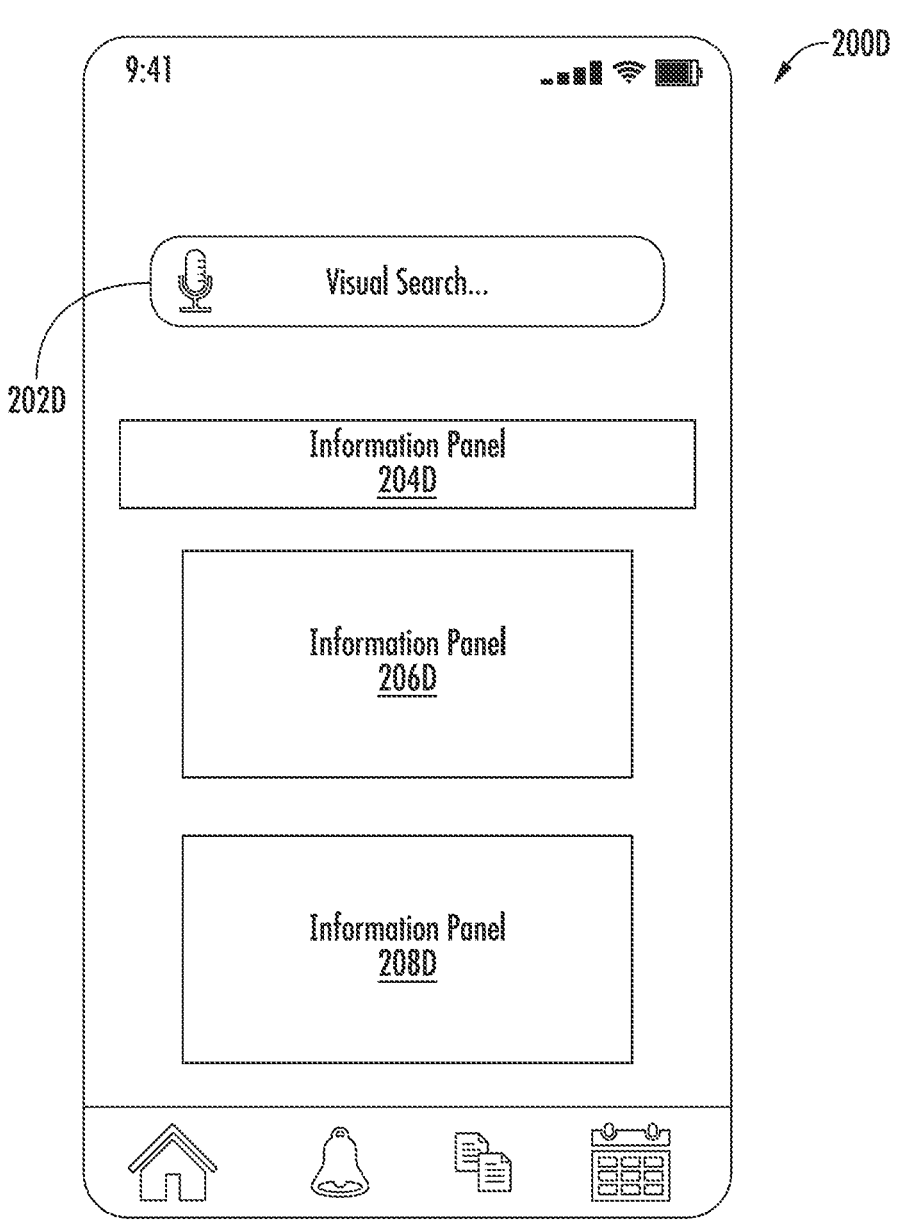
FIG. 2D illustrates an example interface for an application with an interface element indicative of a visual search feature of the application according to some other embodiments of the present disclosure.

FIG. 2D illustrates an example interface 200D for an application (e.g., a virtual assistant application) with an interface element 202D indicative of a visual search feature of the application according to some other embodiments of the present disclosure. Specifically, the interface element 202D indicates the visual search feature and prompts a spoken utterance from a user that can activate the visual search feature. For example, a user may interact with the interface element 202D to prompt the virtual assistant application to capture a spoken utterance from the user. The spoken utterance may request that the application capture a query image (e.g., via a camera device accessed by the application) and perform a visual search for the query image.

Figure 3A:
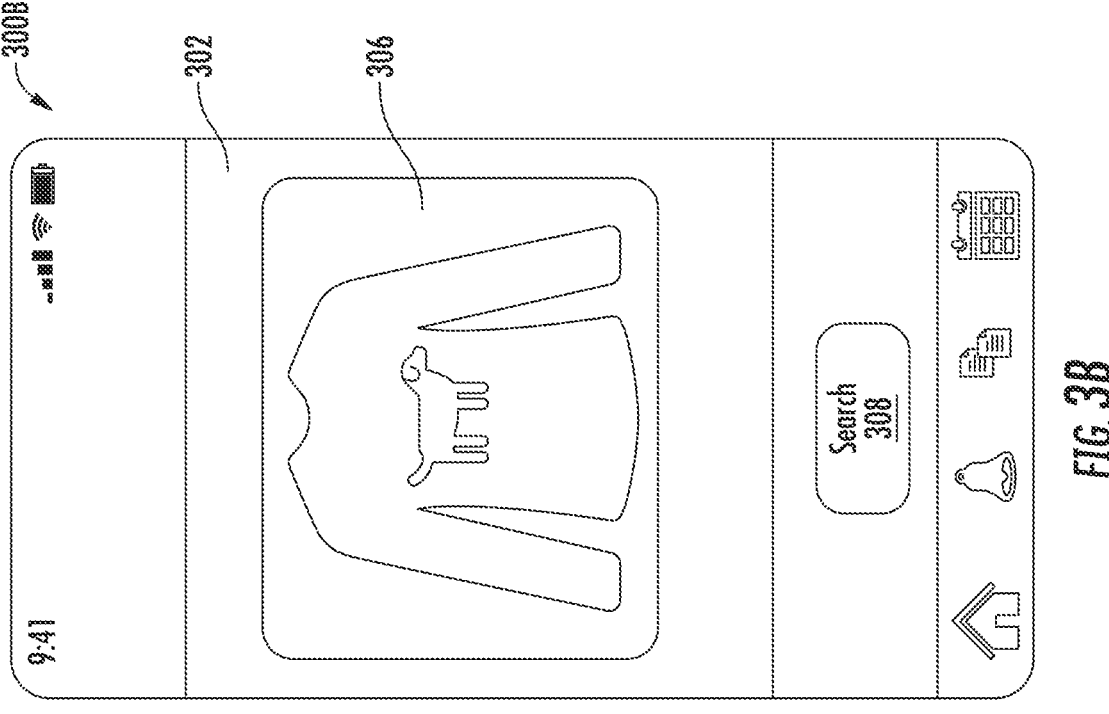
FIG. 3A illustrates an example interface for an application with an interface element 304 for capturing one or more query images for a visual search feature of the application according to some embodiments of the present disclosure.

FIG. 3A illustrates an example interface 300A for an application with an interface element 304 for capturing one or more query images for a visual search feature of the application according to some embodiments of the present disclosure. Specifically, the interface 300A includes a viewfinder 302 for a camera device of a user device providing the interface 300A. The viewfinder 302 can depict a scene currently viewed by the camera device. The interface 300A further includes a capture element 304 that, when interacted with, captures one or more of the query images for the visual search (e.g., via a touch or touch-and-hold input to a touchscreen, etc.).

It should be noted that in some embodiments, the one or more query images may not be captured through the viewfinder 302 of the interface 300A. Rather, the one or more query images may be images that were previously captured. For example, the query image(s) may have been captured by the user through the viewfinder 302 prior to execution of the visual search application. For another example, the query image(s) may have been captured via a separate image capture application. For yet another example, the query image(s) may have been captured via download from an external image hosting server (e.g., an image search service, etc.)

It should be noted that interface 300A may only be utilized in accordance with some embodiments of the present disclosure. For example, in some embodiments, the interface 300A may be provided in response to user interaction with the interface element 202A of FIG. 2A. For another example, the interface 300A may be provided in response to user interaction with the interface element 202B of FIG. 2B. For yet another example, the interface 300A may not be provided in response to user interaction with the interface element 202C, as the user has already been provided with a viewfinder element.

Figure 3B:
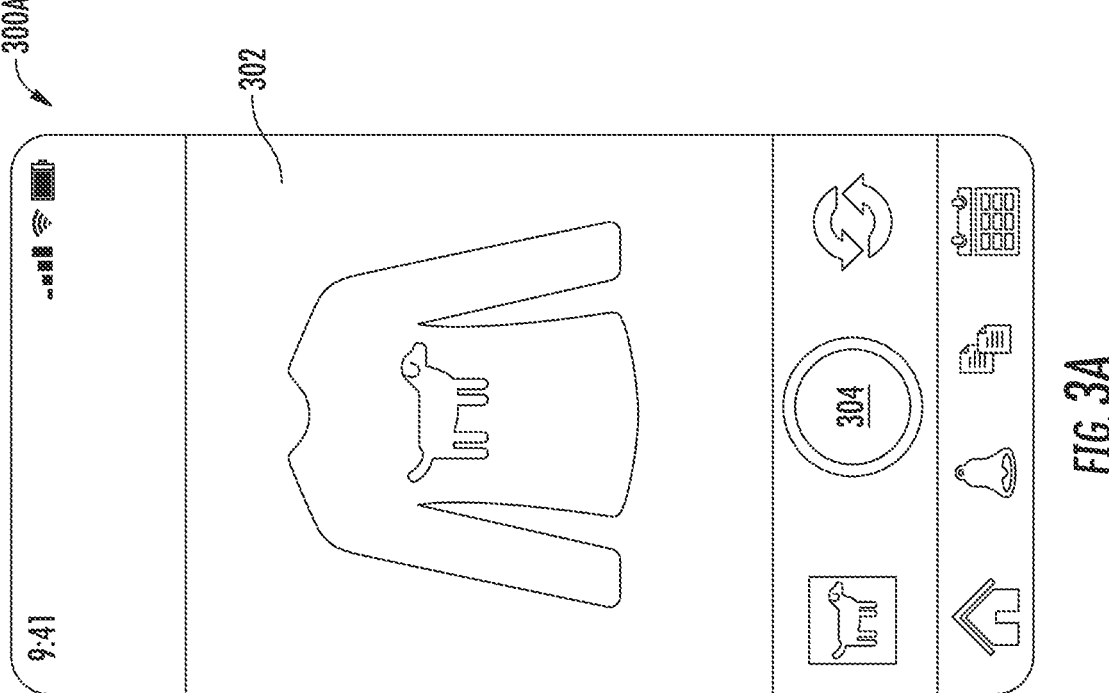
FIG. 3B illustrates an example interface for an application with a cropping element for cropping a captured query image for a visual search feature of the application according to some embodiments of the present disclosure.

FIG. 3B illustrates an example interface 300B for an application with a cropping element 306 for cropping a captured query image for a visual search feature of the application according to some embodiments of the present disclosure. Specifically, in some embodiments, the cropping element 306 allows for the user to remove extraneous portions of the captured query image before providing the query image for the visual search feature. It should be noted that interface 300B may only be utilized in accordance with some embodiments of the present disclosure. For example, in some embodiments, the interface 300B may be provided in response to user interaction with the capture element 304 of FIG. 3A. For another example, in some embodiments, the interface 300B may or may not be provided after user interaction with the interface element 202C of FIG. 2C.

In some embodiments, the interface 300B may include a search element 308. The search element 308 can indicate to the application (e.g., the virtual assistant application) that the user has finished cropping the query image with the cropping element 306, and that the application can initiate the visual search. Alternatively, in some embodiments, the interface 300B may not include the search element 308, and may determine that the user has finished cropping the query image after the user has not interacted with the cropping element 306 after a threshold period of time.

Figure 4:
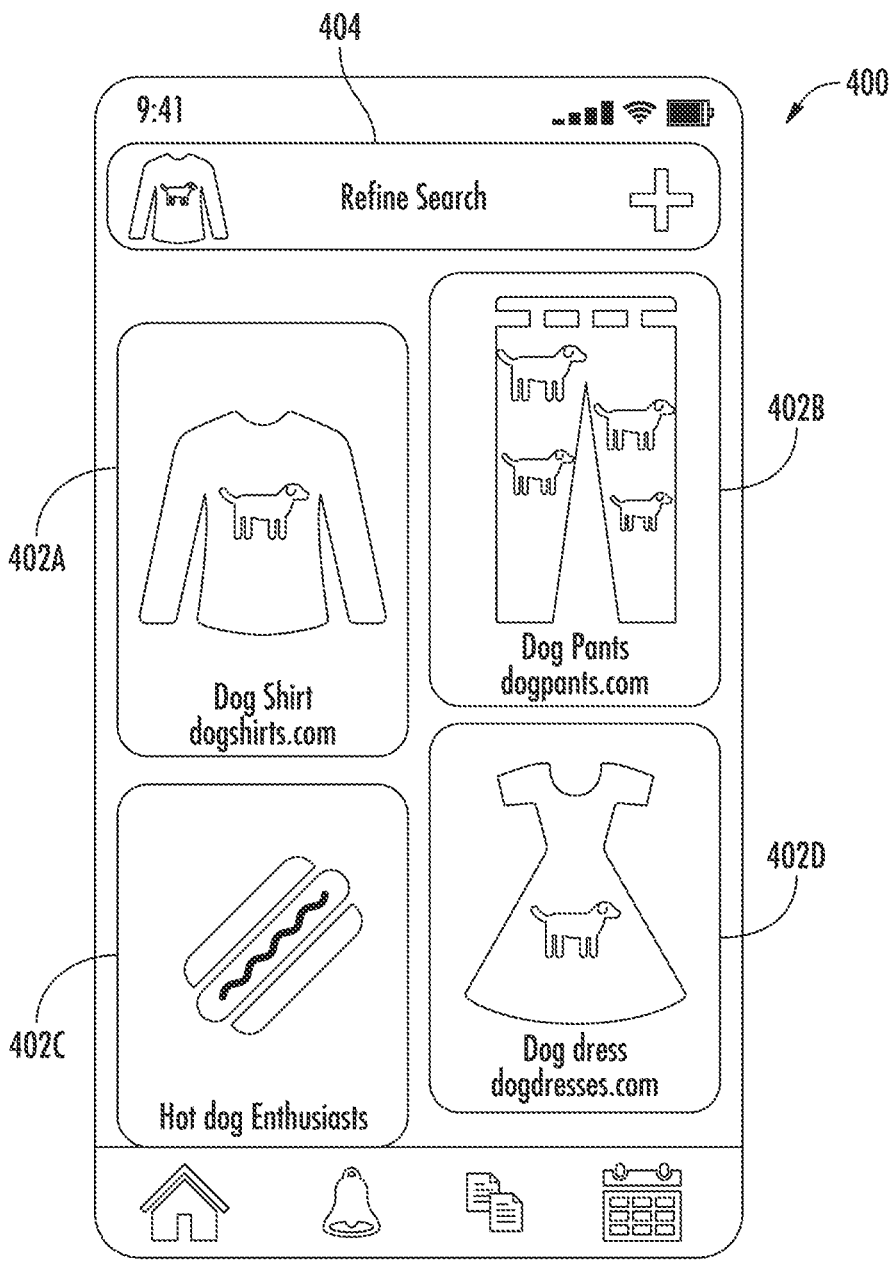
FIG. 4 illustrates an example interface for a search interface that includes one or more result images responsive to a visual search performed for one or more query images according to some embodiments of the present disclosure.

FIG. 4 illustrates an example interface 400 for a search interface that includes one or more result images responsive to a visual search performed for one or more query images according to some embodiments of the present disclosure. Specifically, the interface 400 includes result images 402A-402D and interface element 404. The result images 402A-402D can be retrieved via a visual search operation based on the query image(s) obtained from the user. For example, the application providing the interface 400 may provide the query image(s) to a visual search service (e.g., via one or more application programming interfaces, etc.) and responsively obtain the result images 402A-402D.

As depicted, in some embodiments, the result images 402A-402D may also include relevant snippets of content associated with the result images 402A-402D. For example, the result image 402A includes a title and URL of a web page that hosts the result image 402A. For another example, a result image may include a short descriptor determined based on a machine learned analysis of the result image. Alternatively, in some embodiments, the result images 402A-402D may not include any relevant snippets. In some embodiments, the result images 402A-402D may be or otherwise include video data (e.g., a video file, an animated GIF, etc.), that plays automatically once retrieved and provided within the interface 400.

In some embodiments, each of the result images 402A-402D can be selected by a user via an interaction with a result image (e.g., via a touchscreen of a user device executing the application, etc.). Interaction with the result image may cause the application to provide an interface that expands the selected result image and provides additional information associated with the result image. In some embodiments, interaction with the expanded selected result image may cause the application to navigate directly to a web page or other source from which the selected result image was retrieved.

The interface element 404 can indicate a request to a user to refine the visual search query. As depicted, in some embodiments, the interface element 404 may be a search bar including textual content prompting the user to provide textual data that includes a refinement to the visual search query. In some embodiments, a preview of the query image(s) is included within the interface element 404. Alternatively, in some embodiments, the interface element 404 may be a search bar, or some other sort of interface element, that does not include a preview of the query image(s). In some embodiments, the interface element 404 may be a navigational element configured to navigate the user to a second interface in which the user can provide a refinement to the visual search query via a textual input field.

Figure 5B:
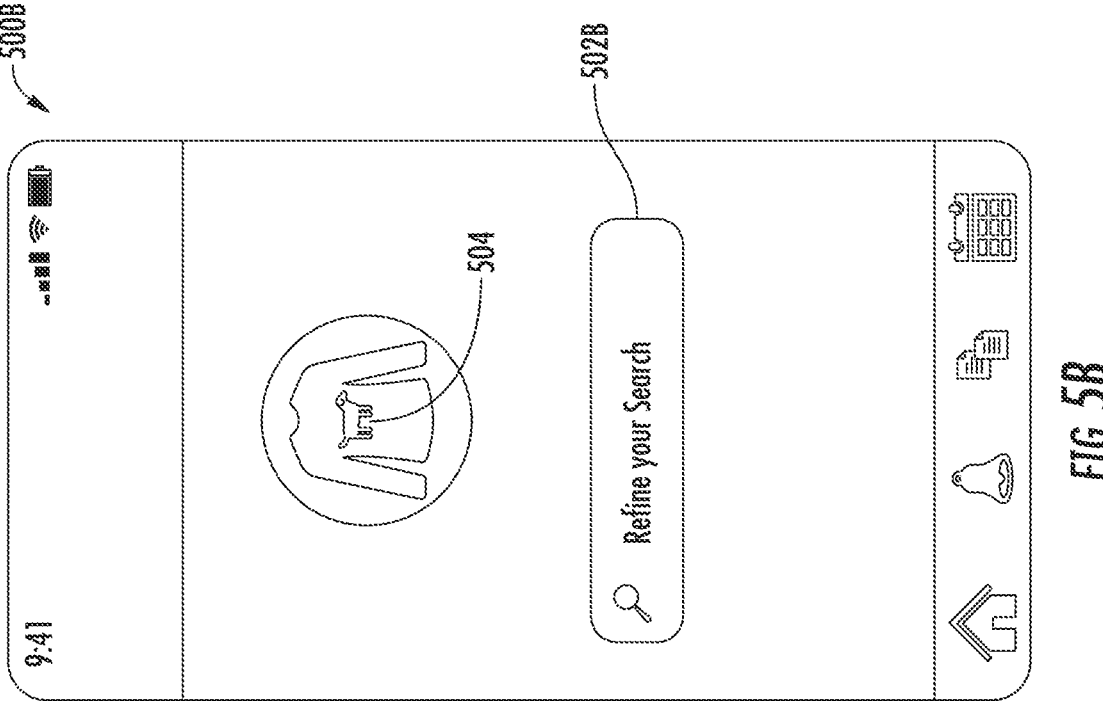
FIG. 5B illustrates an example interface for a second interface that includes a textual input field for obtaining a refinement to the visual search query according to some embodiments of the present disclosure.
Figure 5A:
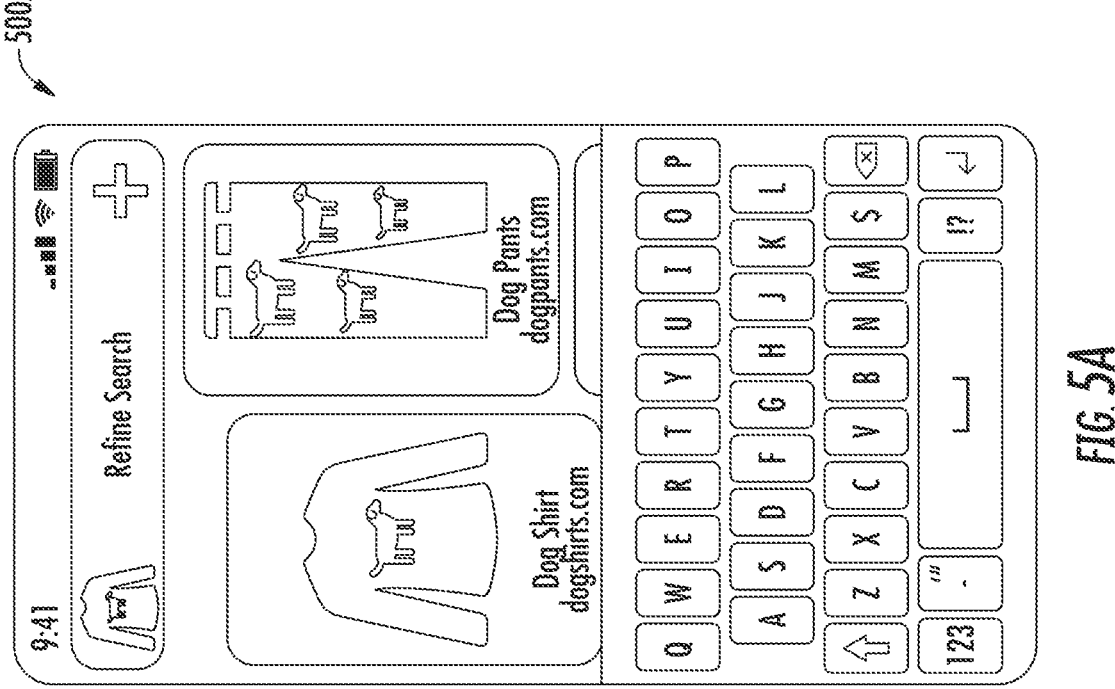
FIG. 5A illustrates an example interface for a search interface that includes a keyboard interface element responsive to interaction with the interface element indicative of the request to the user to refine the visual search query according to some embodiments of the present disclosure.

FIG. 5A illustrates an example interface 500A for a search interface that includes a keyboard interface element responsive to interaction with the interface element indicative of the request to the user to refine the visual search query according to some embodiments of the present disclosure. Specifically, the keyboard interface element 502A can be provided responsive to user interaction with the interface element indicative of the request to the user to refine the visual search query (e.g., interface element 404 of FIG. 4). For example, the user may interact with the interface element indicative of the request to the user to refine the visual search query (e.g., providing a touch gesture to the interface element via a touchscreen). In response, in some embodiments the application may provide a keyboard interface element 502A that the user can utilize to provide textual data including the refinement to the visual search query. In some embodiments, the keyboard interface element 502A may be provided directly by the application. Alternatively, in some embodiments, the application may request the keyboard interface element 502A from an operating system of a user device, or a second application executed by the user device (e.g., a separate keyboard application, etc.). Textual content provided by the user can be visualized within the interface element (e.g., element 404 of FIG. 4).

FIG. 5B illustrates an example interface 500B for a second interface that includes a textual input field for obtaining a refinement to the visual search query according to some embodiments of the present disclosure. Specifically, the interface 500B can be provided responsive to user interaction with the interface element indicative of the request to the user to refine the visual search query (e.g., interface element 404 of FIG. 4). The interface 500B can include a textual input field 502B that allows the user to enter a visual search query via the textual input field. In some embodiments, interaction by the user with the textual input field 502B may cause the application to provide a keyboard interface element as described with regards to keyboard interface element 502A of FIG. 5A. In some embodiments, the interface 500B can include a preview element 504 that depicts a preview of the query image(s).

Figure 6A:
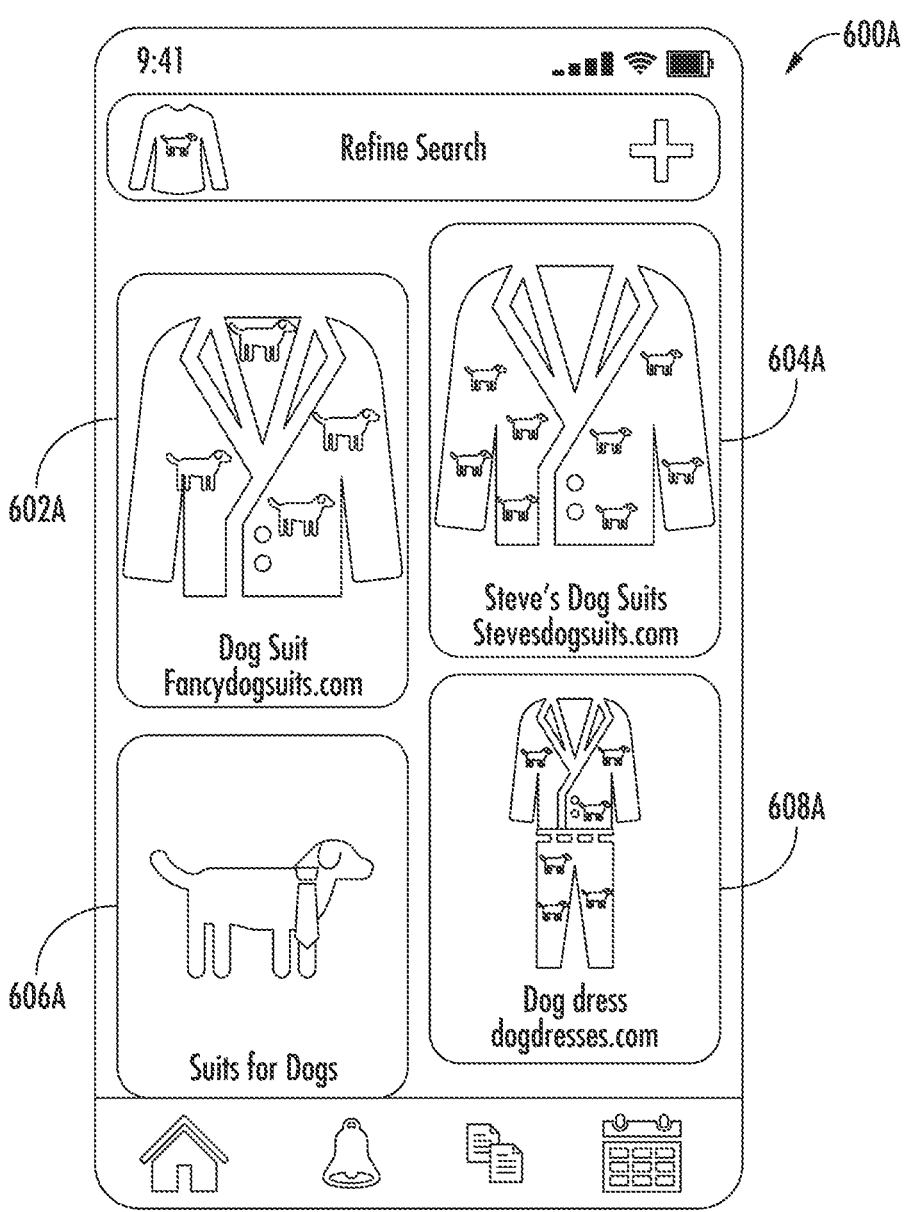
FIG. 6A illustrates an example refined search interface including one or more refined search results according to some embodiments of the present disclosure.

FIG. 6A illustrates an example refined search interface 600A including one or more refined search results 602A-608A according to some embodiments of the present disclosure. Specifically, after obtaining the textual data including the refinement to the visual search query, the textual data can be appended to the visual search query to obtain a multimodal search query. Refined search results 602A-608A can be retrieved based on the multimodal search query, and refined search result interface 600A can be provided for display to the user. The refined search interface 600A can include the refined search results 602A-608A. In some embodiments, the refined search results 602A-608A can be refined result images that are more accurate than the result image(s) retrieved previously (e.g., as described with regards to FIG. 4). For example, as depicted, the user has provided textual content including the word "suit". Based on the refinement, refined result images 602A-608A can be retrieved that depict a suit that matches aspects of the query image(s). For example, refined result images of suits with dog patterns, or refined result images of dogs wearing suits, can be retrieved based on the multimodal query.

Figures 6B, 6C:
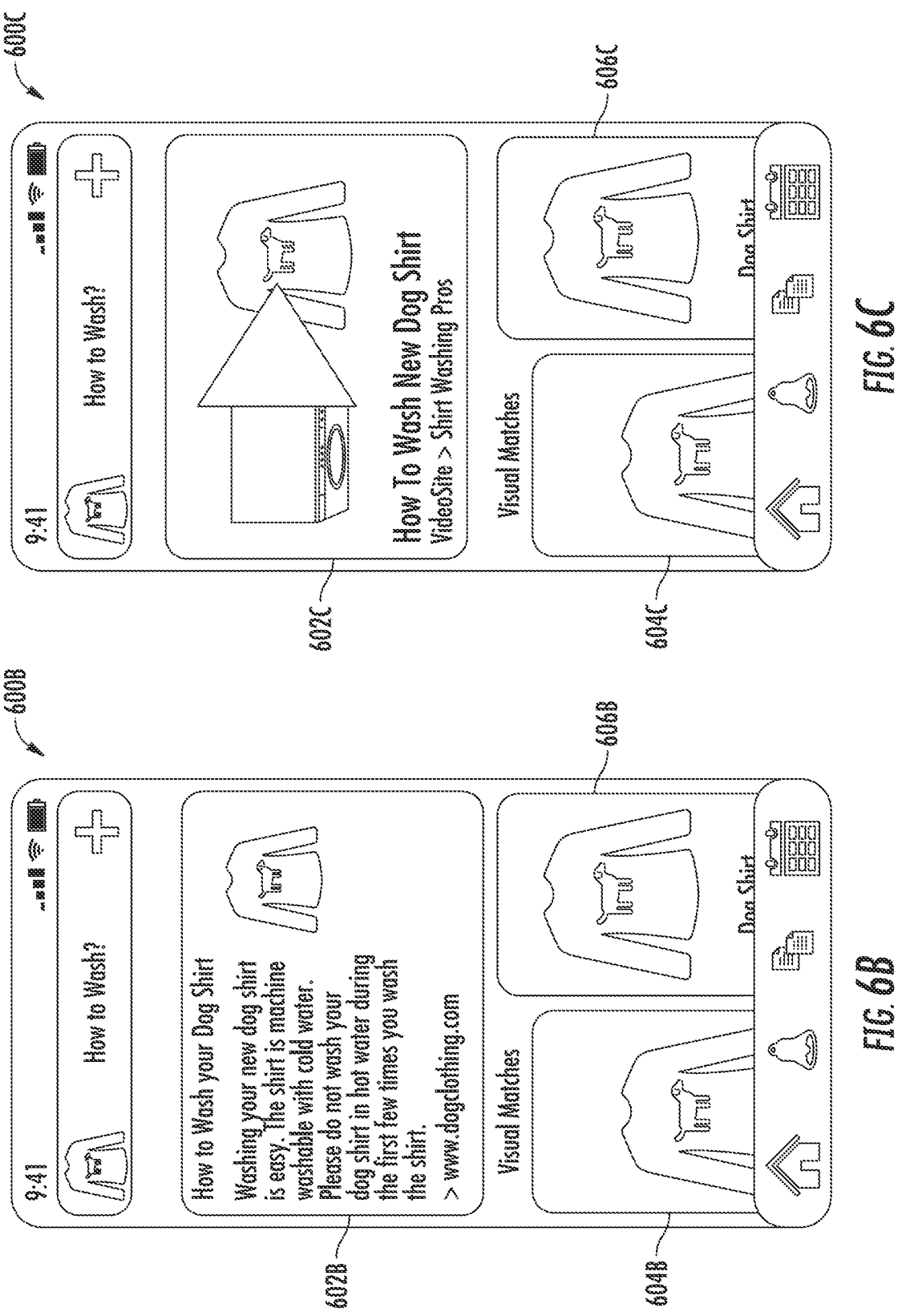
FIG. 6B illustrates an example refined search interface including one or more refined search results according to some other embodiments of the present disclosure.
FIG. 6C illustrates an example refined search interface including one or more refined search results according to some other embodiments of the present disclosure.

FIG. 6B illustrates an example refined search interface 600B including one or more refined search results 602B-606B according to some other embodiments of the present disclosure. Specifically, as depicted, in some embodiments the refined search results 602B-606B may include refined result images (e.g., search results 604B and 606B) and an interface element 602B. The interface element can include content responsive to the multimodal search query, and can include textual content associated with the query, a link to content associated with the query, or both. For example, as depicted, the user has provided textual content including the phrase "How to wash dog shirt?". Based on the refinement, refined search result interface element 602B can be retrieved. The interface element 602B can include textual content from a web site responsive to the multimodal search query. For example, the textual content included in the interface element 602B may be retrieved from a web site that hosts the refined result image 604B. Additionally, in some embodiments, the interface element 602B may include a link to the website that hosts the refined result image 604B.

FIG. 6C illustrates an example refined search interface 600C including one or more refined search results 602C-606C according to some other embodiments of the present disclosure. Specifically, as depicted, in some embodiments the refined search results 602C-606C may include refined result images (e.g., search results 604C and 606C) and a multimedia interface element 602C. The multimedia interface element 602C can include multimedia content (e.g., a video, a video and textual content associated with the video, etc.) responsive to the multimodal search query. For example, as depicted, the user has provided textual content including the phrase "How to wash dog shirt?". Based on the refinement, multimedia interface element 602C can be retrieved. The multimedia interface element 602C can include a video associated with the multimodal search query. In some embodiments, the multimedia interface element 602C may also include textual content, image(s), link(s), audio data, and/or any other sort of content retrieved responsive to the multimodal search query.

Figure 6D:
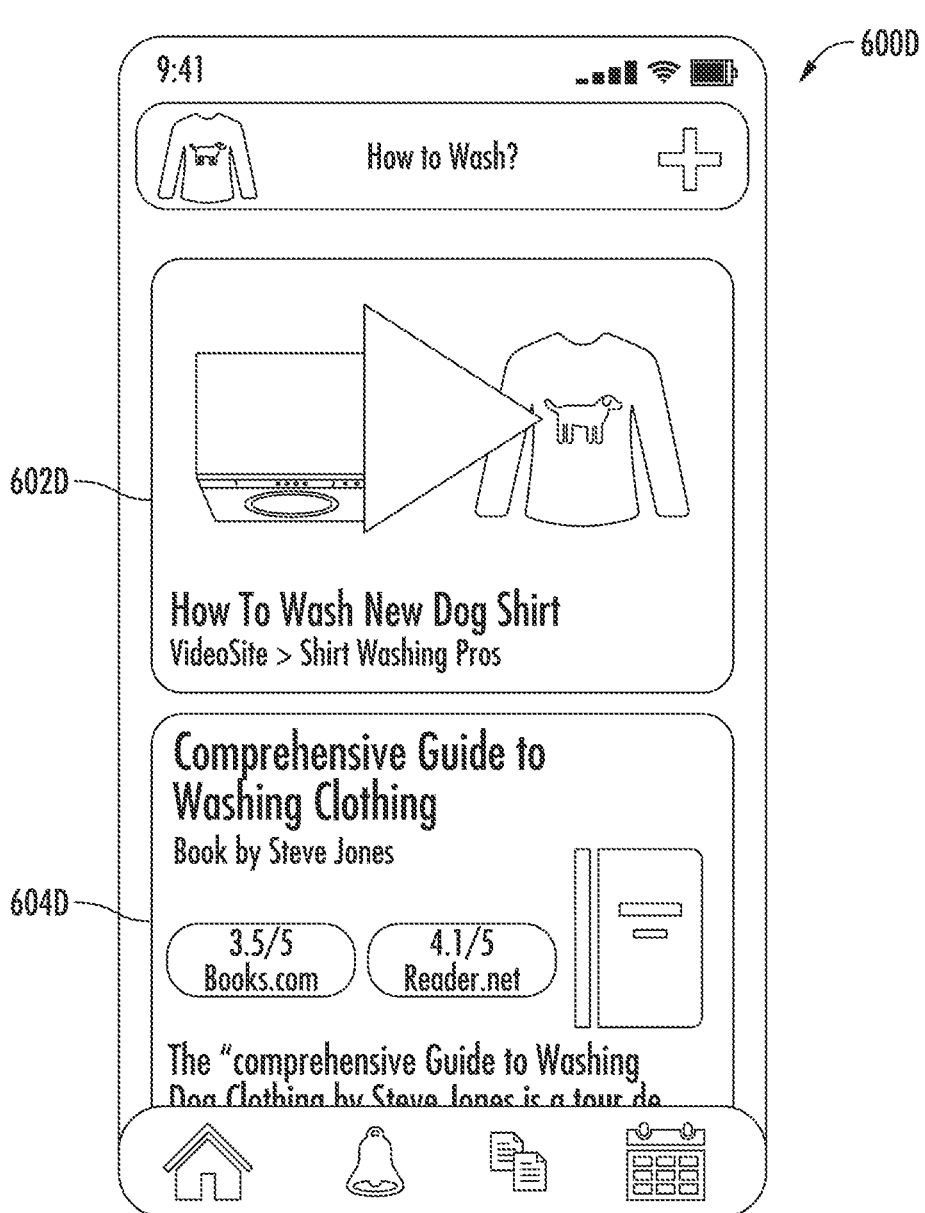
FIG. 6D illustrates an example refined search interface including refined search results according to some other embodiments of the present disclosure.

FIG. 6D illustrates an example refined search interface 600D including refined search results 602D-604D according to some other embodiments of the present disclosure. Specifically, as depicted, in some embodiments the refined search results 602D-604D may include a multimedia element 602D, as described with regards to FIG. 6C, and a commerce element 602D. The commerce element 602D can include information descriptive of a product that is retrieved responsive to the multimodal search query. For example, as depicted, the user has provided textual content including the phrase "How to wash dog shirt?". Based on the refinement, the commerce element 604D can be retrieved and provided for display. For example, the commerce element 604D can include information that describes a book related to washing clothing. This information can include reviews for the product, and links to websites that provide the product for purchase. In some embodiments, the commerce element may include an image of the product.

Example Methods

Figure 7:
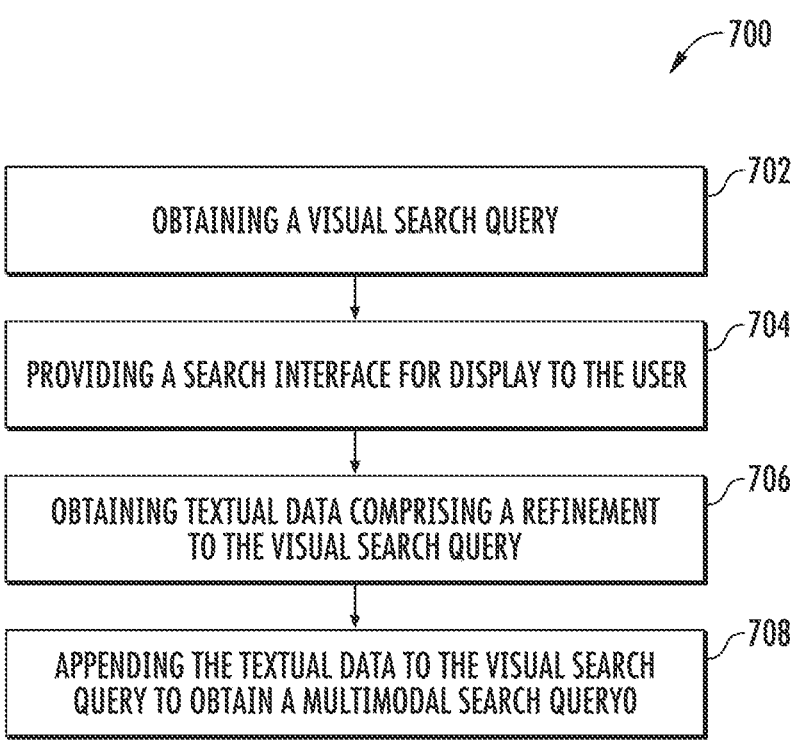
FIG. 7 depicts a flow chart diagram of an example method to perform according to example embodiments of the present disclosure.

FIG. 7 depicts a flow chart diagram of an example method 700 to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system obtains a visual search query. Specifically, the computing system obtains a visual search query from a user comprising one or more query images. In some embodiments, prior to the visual search query, the computing system providing an interface for a virtual assistant application. The interface for the virtual assistant application comprises an interface element indicative of a visual search feature of the virtual assistant application. In some embodiments, the one or more images comprises a plurality of images collectively forming video data.

At 704, the computing system provides a search interface for display to the user. Specifically, the computing system provides a search interface for display to the user that includes one or more result images responsive to the one or more query images and an interface element indicative of a request to the user to refine the visual search query. In some embodiments, the interface element indicative of the request to the user to refine the visual search query comprises a voice interface element for collection of voice data comprising a spoken utterance from the user that is descriptive of the textual content.

At 706, the computing system obtains textual data including a refinement to the visual search query. In some embodiments, the second interface comprises a textual input field for input of the refinement to the visual search query. To obtain the textual data, the computing system obtains textual data comprising a refinement to the visual search query via the textual input field.

At 708, the computing system appends the textual data to the visual search query to obtain a multimodal search query. In some embodiments, the computing system retrieves one or more refined search results based on the multimodal search query.

In some embodiments, the computing system provides a refined search interface for display to the user, the refined search interface comprising the one or more refined search results. In some embodiments, each of the one or more refined search results includes a refined result image, refined result video data, an interface element comprising textual content responsive to the multimodal search query, an interface element comprising a link to content responsive to the multimodal search query, a commerce element comprising information descriptive of a product responsive to the multimodal search query, or a multimedia interface element comprising textual content, one or more images, video data, a link to content responsive to the multimodal search query, and/or audio data.

In some embodiments, the refined search interface further comprises a textual input field for further refinement of the multimodal search query.

In some embodiments, the interface element indicative of the request to the user to refine the visual search query comprises a textual input field.

In some embodiments, the interface element indicative of the request to the user to refine the visual search query comprises a navigational element configured to navigate the user to a second interface

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for multimodal search refinement, the method comprising:

obtaining, by a computing system comprising one or more computing devices, a visual search query from a user comprising one or more query images;

causing, by the computing system, a search interface to be displayed for the user, the search interface comprising one or more result images responsive to the one or more query images and an interface element indicative of a request to the user to refine the visual search query;

obtaining, by the computing system from the user, textual data comprising a refinement to the visual search query;

determining, by the computing system, based on using a machine-learned model to process the one or more query images and the textual data, a multimodal search query, wherein the machine-learned model is trained to modify the one or more query images based on the textual data;

retrieving, by the computing system, one or more refined search results based on the multimodal search query, wherein a first refined search result of the one or more refined search results comprises an image associated with a particular web page;

processing, by the computing system, textual web content with the machine-learned model to obtain textual content descriptive of the first refined search result of the one or more refined search results, wherein the textual web content is extracted from the particular web page; and causing, by the computing system, a refined search interface to be displayed for the user, the refined search interface comprising a refined search result interface element that comprises the first refined search result and the textual content descriptive of the first refined search result.

2. The computer-implemented method of claim 1, wherein, prior to obtaining the visual search query from the user, the method comprises:

causing, by the computing system, an interface for a virtual assistant application to be displayed to the user, wherein the interface for the virtual assistant application comprises an interface element indicative of a visual search feature of the virtual assistant application.

3. The computer-implemented method of claim 1, wherein the one or more refined search results further comprises a second refined search result, comprising:

a refined result image;

refined result video data;

an interface element comprising textual content responsive to the multimodal search query;

an interface element comprising a link to content responsive to the multimodal search query;

a commerce element comprising information descriptive of a product responsive to the multimodal search query; or a multimedia interface element comprising textual content, one or more images, video data, a link to content responsive to the multimodal search query, and/or audio data.

4. The computer-implemented method of claim 1, wherein the refined search interface further comprises a textual input field for further refinement of the multimodal search query.

5. The computer-implemented method of claim 1, wherein the interface element indicative of the request to the user to refine the visual search query comprises a textual input field.

6. The computer-implemented method of claim 1, wherein the interface element indicative of the request to the user to refine the visual search query comprises a navigational element configured to navigate the user to a second interface.

7. The computer-implemented method of claim 6, wherein the second interface comprises a textual input field for input of the refinement to the visual search query; and wherein obtaining the textual data comprising the refinement to the visual search query comprises obtaining, by the computing system from the user, textual data comprising a refinement to the visual search query via the textual input field.

8. The computer-implemented method of claim 1, wherein the interface element indicative of the request to the user to refine the visual search query comprises a voice interface element for collection of voice data comprising a spoken utterance from the user that is descriptive of the refinement to the visual search query.

9. The computer-implemented method of claim 1, wherein the one or more result images comprises a plurality of images that collectively form video data.

10. The computer-implemented method of claim 1, wherein obtaining the visual search query from the user comprising the one or more query images comprises:

obtaining, by the computing system, a first query image depicting a first object, wherein the first object comprises a plurality of different properties; and wherein obtaining the textual data comprises:

obtaining, by the computing system from the user, textual data comprising the refinement to the visual search query, wherein the refinement is indicative of a value for a particular property of the plurality of different properties.

11. The computer-implemented method of claim 10, wherein appending the textual data to the visual search query to obtain the multimodal search query comprises:

determining, by the computing system, an intended property for the refinement from the plurality of different properties; and generating, by the computing system, the multimodal search query, wherein the multimodal search query comprises a query for content associated with the object comprising the value for the particular property.

12. A computing system for multimodal search refinement, comprising:

one or more processors;

one or more non-transitory computer-readable media that store instructions that, when executed by the one or more processors, cause the computing system to perform operations, the operations comprising:

obtaining a visual search query from a user comprising one or more query images;

providing a search interface for display to the user, the search interface comprising one or more result images responsive to the one or more query images and an interface element indicative of a request to the user to refine the visual search query;

obtaining textual data comprising a refinement to the visual search query;

determining, based on using a machine-learned model to process the one or more query images and the textual data, a multimodal search query, wherein the machine-learned model is trained to modify the one or more query images based on the textual data;

retrieving one or more refined search results based on the multimodal search query, wherein a first refined search result of the one or more refined search results comprises an image associated with a particular web page;

processing textual web content with the machine-learned model to obtain textual content descriptive of the first refined search result of the one or more refined search results, wherein the textual web content is extracted from the particular web page; and causing a refined search interface to be displayed for the user, the refined search interface comprising a refined search result interface element that comprises the first refined search result and the textual content descriptive of the first refined search result.

13. The computing system of claim 12, wherein, prior to obtaining the visual search query from the user, the operations comprise:

causing an interface for a virtual assistant application to be displayed to the user, wherein the interface for the virtual assistant application comprises an interface element indicative of a visual search feature of the virtual assistant application.

14. The computing system of claim 12, wherein the one or more refined search results further comprises a second refined search result, comprising:

a refined result image;

refined result video data;

an interface element comprising textual content responsive to the multimodal search query;

an interface element comprising a link to content responsive to the multimodal search query;

a commerce element comprising information descriptive of a product responsive to the multimodal search query; or a multimedia interface element comprising textual content, one or more images, video data, a link to content responsive to the multimodal search query, and/or audio data.

15. The computing system of claim 12, wherein the refined search interface further comprises a textual input field for further refinement of the multimodal search query.

16. The computing system of claim 12, wherein the interface element indicative of the request to the user to refine the visual search query comprises a textual input field.

17. The computing system of claim 12, wherein the interface element indicative of the request to the user to refine the visual search query comprises a navigational element configured to navigate the user to a second interface;

wherein the second interface comprises a textual input field for input of the refinement to the visual search query; and wherein obtaining the textual data comprising the refinement to the visual search query comprises obtaining textual data comprising a refinement to the visual search query via the textual input field.

18. One or more non-transitory computer-readable media that store instructions that, when executed by one or more processors, cause the computing system to perform operations, the operations comprising:

obtaining a visual search query from a user comprising one or more query images;

providing a search interface for display to the user, the search interface comprising one or more result images responsive to the one or more query images and an interface element indicative of a request to the user to refine the visual search query;

obtaining textual data comprising a refinement to the visual search query;

determining, based on using a machine-learned model to process the one or more query images and the textual data, a multimodal search query, wherein the machine-learned model is trained to modify the one or more query images based on the textual data;

retrieving one or more refined search results based on the multimodal search query, wherein a first refined search result of the one or more refined search results comprises an image associated with a particular web page;

processing textual web content and the image associated with the particular web page with the machine-learned model to obtain textual content descriptive of the first refined search result of the one or more refined search results, wherein the textual web content is extracted from the particular web page; and causing a refined search interface to be displayed for the user, the refined search interface comprising a refined search result interface element that comprises the first refined search result and the textual content descriptive of the first refined search result.

* * * * *